United States Patent [19]
Power

[11] Patent Number: 5,278,648
[45] Date of Patent: Jan. 11, 1994

[54] MIXED FIELD TIME-MULTIPLEXED VIDEO TRANSMISSION SYSTEM AND METHOD

[75] Inventor: Donald W. Power, Sykesville, Md.

[73] Assignee: Comsat, Washington, D.C.

[21] Appl. No.: 707,533

[22] Filed: May 30, 1991

[51] Int. Cl.[5] .............................................. H04N 7/04
[52] U.S. Cl. .................................... 358/141; 358/133
[58] Field of Search ............... 358/141, 135, 136, 133, 358/140, 149, 150, 153, 11, 12, 14

[56] References Cited

U.S. PATENT DOCUMENTS

| | | | |
|---|---|---|---|
| 4,839,720 | 6/1989 | Isnardi | 358/141 |
| 4,967,272 | 10/1990 | Kao et al. | 358/11 |
| 5,012,326 | 4/1991 | Sakamoto et al. | 358/140 |
| 5,025,309 | 6/1991 | Isnardi | 358/141 |

FOREIGN PATENT DOCUMENTS

| | | | |
|---|---|---|---|
| 58-225786 | 12/1983 | Japan | H04N 7/00 |
| 60-158785 | 8/1985 | Japan | H04N 7/13 |

Primary Examiner—James J. Groody
Assistant Examiner—Glenton B. Burgess
Attorney, Agent, or Firm—Sughrue, Mion, Zinn, Macpeak & Seas

[57] ABSTRACT

A compound time-multiplexed video transmission processing system transmitting and receiving a signal corresponding to luminance signal for driving a video display includes a transmit processor for processing a received luminance signal to produce a time-multiplexed mixed field signal based on a high frequency signal corresponding to a high frequency portion of the input luminance signal received during a previous field and a half bandwidth signal received during a current field, and a receive processor for processing the mixed field signal to produce an output luminance signal based on the high frequency portion and the half bandwidth signal. The transmit processor includes circuitry for storing the high frequency portion of the input luminance signal from the previous field. The system produces an artifact in the mixed field signal, which is evenly distributed in the output luminance signal in a predetermined processing sequence. A method for processing luminance signals is also disclosed.

12 Claims, 4 Drawing Sheets

——— FULL BANDWIDTH LINES

- - - - - - REDUCED BANDWIDTH LINES x - FIELD 1
o - FIELD 2

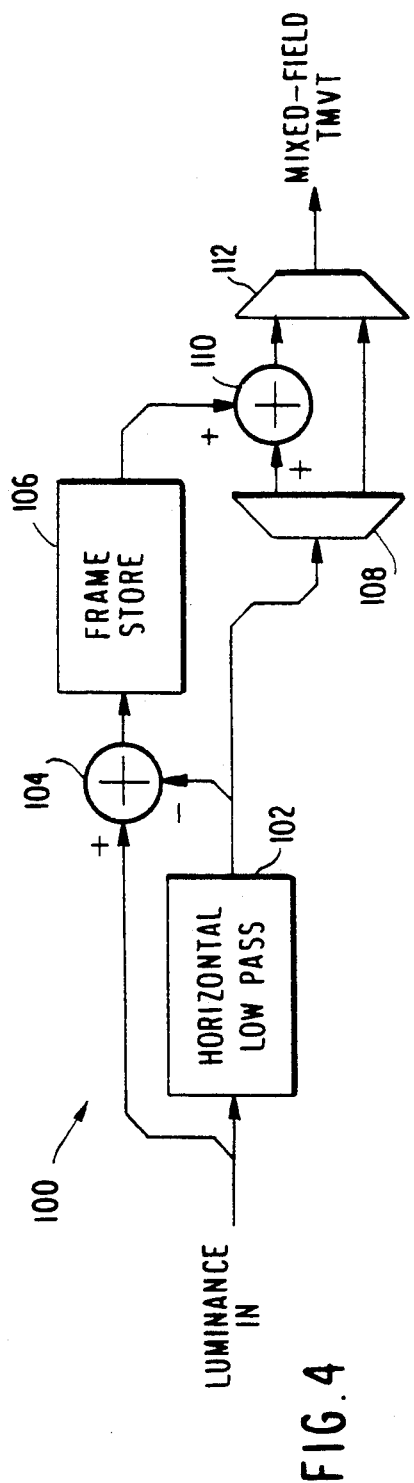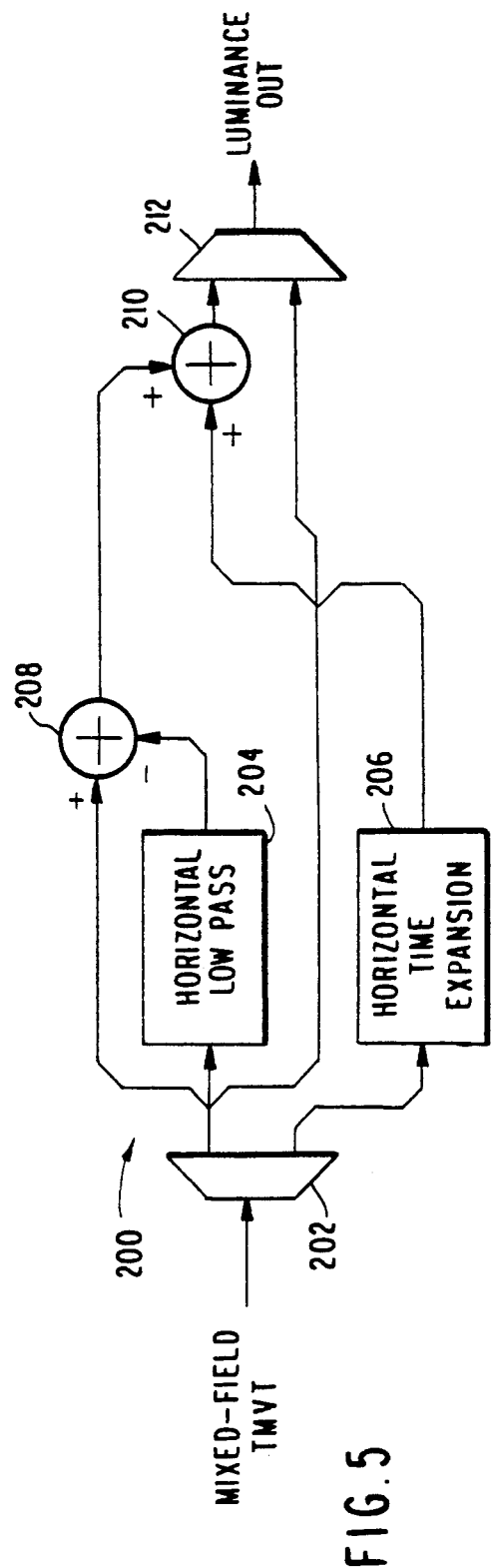

MIXED FIELD TIME-MULTIPLEXED VIDEO TRANSMISSION SYSTEM AND METHOD

FIELD OF THE INVENTION

The present invention relates generally to a video transmission system, and, more specifically, to a compound time-multiplexed video transmission processing system. The present invention further relates to a method for processing input luminance signals to permit transmission of mixed field time-multiplexed video transmission signals and generation of output luminance signals corresponding to the input luminance signals for driving a video display.

BACKGROUND OF THE INVENTION

A variety of techniques and systems are known for processing video signals to allow transmission of compressed video information between sites and for regenerating full bandwidth video signals at a receiving site. Intra-Field time-multiplexed video transmission (TMVT) is one technique, which offers good quality video performance at reasonably low cost. It will be appreciated that TMVT systems operate without producing temporal artifacts, since all processing takes place in the same video field. However, TMVT systems suffer from a loss of spatial resolution which results in somewhat blurry images reminiscent of consumer grade video tape. The video images encoded by TMVT systems is often characterized as being 37 soft."

Some of the "softness" exhibited by systems employing TMVT processing can be attributed to the distance between lines in an interlaced video field. The correlation between adjacent lines is an important factor in TMVT processing, since the high frequency portion of the video scene is 2:1 decimated on a line basis by the transmitter. The information for the missing lines is then generated by interpolation in the receiver. The fidelity achieved by interpolation is directly related to the correlation between the high frequency lines present in the signal arriving at the receiver.

Another factor affecting the perceived spatial resolution of the video image produce by TMVT systems is the use of vertical filters on both the transmitter and receiver sides of the system. Serial implementation of vertical filters seriously limits the vertical impulse response of the system. While operation without a transmit side vertical filter would leave the coder/decoder (codec) pair open to vertical aliasing due to the decimation process, this artifact would not seem to be serious, especially in a codec whose input is a comb-filter decoded NTSC video signal, since the comb filter is actually a vertical filter.

Yet another factor affecting the spatial resolution of the video image is the uneven error dispersal, which is quite evident in video images produced using TMVT processing. As shown, for example, in FIG. 1, all of the interpolation error is concentrated in one line of the two line pair which makes up the TMVT transmission format. When interlaced with the other field forming the NTSC video frame, the lines containing interpolation errors appear as pairs, producing an artifact that is generally characterized as "line crawl."

FIG. 2 illustrates a conventional intra-field TMVT transmitter, which is implemented using digital low-pass filtering of the input luminance signal. The TMVT transmitter 1 comprises a horizontal low pass filter 2 receiving a luminance signal and generating a half bandwidth signal, a subtractor 3 receiving the luminance signal and the half bandwidth signal and generating a high frequency signal corresponding to the high frequency component of the luminance signal, and a vertical low pass filter 4 receiving the high frequency signal and providing a filtered high frequency signal. Transmitter further comprises a demultiplexer 5 operatively connected to an adder 6 and a multiplexer 7, which is also connected to the output terminal of adder 6. It will be noted that adder 6 is also connected to filter 4 so that adder 6 receives both the filtered high frequency signal as well as the half bandwidth signal.

During operation, filter 2 generates a half bandwidth signal from the received luminance signal. The half bandwidth signal is subtracted from the luminance signal in subtractor 3, which yields the high frequency luminance component, i.e., the high frequency signal received by filter 4. This high frequency component is vertically filtered and 2:1 decimated, by techniques well known to those of ordinary skill in the art, and added to alternate lines of the low frequency luminance signal, i.e., the half bandwidth signal produced by filter 2 and supplied to adder 6 via demultiplexer 5. The resultant lines produced by adder 6 are of full bandwidth and are transmitted by a transmitter (not shown) as such. The other lines, which contain only half bandwidth signals, are horizontally 2:1 decimated, time compressed, preferably by multiplexer 7, and then multiplexed with the full bandwidth lines produced by adder 6 for transmission. The resultant signal produced by multiplexer 7 is an intra-field TMVT signal.

FIG. 3 illustrates a conventional intra-field TMVT receiver processor 10, which performs a complementary function, and which comprises a demultiplexer 11 connected to a horizontal low pass filter 12, a subtractor 14 and a multiplexer 17, all receiving the full bandwidth portion of the intra-field TMVT signal. Demultiplexer 11 is also connected to a time expansion circuit 13 which receives the half bandwidth portion of the intra-field TMVT signal. Subtractor 14 also receives a low frequency signal from filter 12 and generates a high frequency component signal provided to adder 16 via vertical low pass filter 15. As shown in FIG. 3, adder 16 is also connected on an input side to expansion circuit 13 and on an output side to multiplexer 17.

During operation, the received intra-field TMVT signal is demultiplexed in demultiplexer 11 into full and half bandwidth lines. The full bandwidth lines are filtered so that the high frequency part may be separated by subtractor 14 in a manner similar to that described above. The half bandwidth lines are horizontally 1:2 time expanded and filtered in expansion circuit 12. The high frequency component signal produced by subtractor 14 is then vertically interpolated from the adjacent lines and added to the expanded half bandwidth signal generated by expansion circuit 13. These interpolated lines, which are the lines produced by adder 16, are then multiplexed with the received full bandwidth lines from demultiplexer 11 by multiplexer 17, producing the resultant output luminance signal.

SUMMARY OF THE INVENTION

The principal object of the present invention is to provide a time-multiplexed mixed field video transmission system having increased video resolution.

Another object of the present invention is to provide a time-multiplexed mixed field video transmission system having increased video resolution, which can be produced at low cost.

Still another object of the present invention is to provide a time-multiplexed mixed field video transmission system wherein artifacts produced by video processing are evenly distributed throughout the output luminance signal.

Yet another object of the present invention is to provide a time-multiplexed mixed field video transmission system having improved spatial resolution without additional video processing components.

These and other objects, features and advantages of the present invention are provided by a time-multiplexed video transmission system comprising a transmit processor receiving an input luminance signal and generating a time-multiplexed video transmission mixed field signal based on the input luminance signal of a current field and a high frequency component of the input luminance signal of a previous field, and a receive processor receiving the mixed field signal and generating an output luminance signal.

According to the present invention, the transmit processor comprises a low pass transmit filter providing a half bandwidth signal based on the input luminance signal, a transmit subtractor operatively coupled to the transmit filter and generating a high frequency signal from the difference between the input luminance signal and the half bandwidth signal, storing means operatively coupled to the subtractor for storing the high frequency signal from a current field and at least one previous field, a transmit demultiplexer operatively coupled to the transmit filter, a transmit adder operatively coupled to the storage means and the demultiplexer for producing a full bandwidth signal based on the half bandwidth signal and the high frequency signal from the previous field, and a transmit multiplexer operatively coupled to the transmit adder and the demultiplexer for producing a time-multiplexed video transmission mixed field signal based on the full bandwidth signal and the half bandwidth signal.

According to the present invention, the receive processor, which receives the mixed field signal and generates an output luminance signal comprises a receive demultiplexer providing a full bandwidth received signal and a half bandwidth received signal based on the mixed field signal, a low pass receiver filter operatively coupled to the demultiplexer for producing a filtered full bandwidth signal based on the full bandwidth received signal, a subtractor operatively coupled to the demultiplexer and the receiver filter for generating a high frequency component signal based on the full bandwidth received signal and the filtered full bandwidth signal, a time expansion circuit operatively coupled to the multiplexer for producing a half bandwidth time expanded signal based on the half bandwidth received signal, an adder operatively coupled to the time expansion circuit for generating a composite full bandwidth signal based on the a high frequency component and the time expanded signal, and a receiver multiplexer operatively coupled to the receive demultiplexer, the time expansion circuit and the subtractor for generating an output luminance signal based on the second full bandwidth and the composite full bandwidth signals.

The compound time-multiplexed video transmission processing system provides improved video performance over the conventional intra-field TMVT processing system without adversely affecting the size or cost of the receiver hardware necessary to implement processing system. The present invention advantageously uses the high frequency component of the highly correlated lines in an adjacent field of the interlaced raster to improve the spatial resolution of the processed video image. Therefore, no additional processing is required in the receive processor, which is an important consideration in point-to-multipoint transmission applications where receiver costs dominate.

The invention further comprises a method for processing a luminance signal for a system having a transmit processor means for processing an input luminance signal for a video image and having a storage circuit storing a high frequency signal based on the input luminance signal and a receive processor means for receiving and processing a transmitted signal based on the input luminance signal to produce an output luminance signal, the method comprising the steps of generating a half bandwidth signal responsive to the input luminance signal, storing the high frequency signal corresponding to about one field of a video image defined by a current line of a current field and an adjacent line of a previous field, producing a time-multiplexed mixed field signal based on the half bandwidth signal and the high frequency signal corresponding to the adjacent line of the previous field, acquiring the mixed field signal in a receive processor, separating the mixed field signal into a received half bandwidth signal and a received full bandwidth signal, subtracting the received half bandwidth signal from the received full bandwidth signal so as to produce a high frequency portion of the mixed field signal, and combining the received full bandwidth signal, the received half bandwidth signal and the high frequency portion to produce the output luminance signal.

These and other objects, features and advantages of the invention are disclosed in or apparent from the following description of preferred embodiments.

BRIEF DESCRIPTION OF THE DRAWINGS

The preferred embodiments are described with reference to the drawings, in which:

FIG. 4 is a schematic diagram of a transmit processor according to the present invention producing a time-multiplexed mixed field video transmission signal;

FIG. 5 is a schematic diagram of a receive processor according to the present invention producing an output luminance signal based on the mixed field signal produced by the transmit processor of FIG. 4;

DESCRIPTION OF THE PREFERRED EMBODIMENTS

Figure 1:
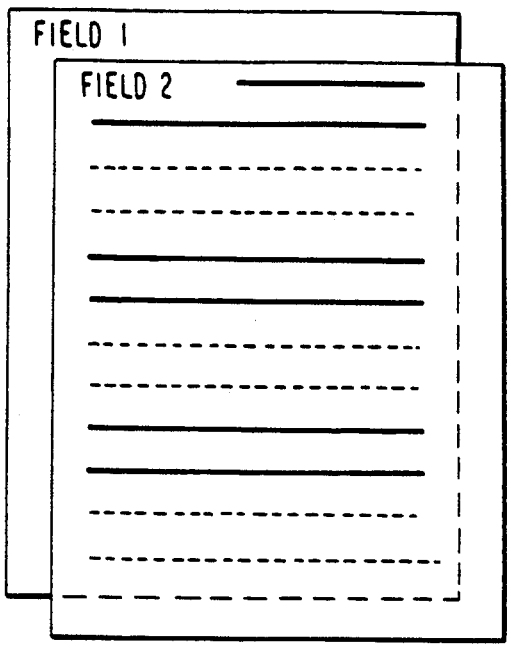
FIG. 1 is a diagram of a interlaced fields of a video image illustrating artifact pairing in a conventional video image.
Figure 7A:
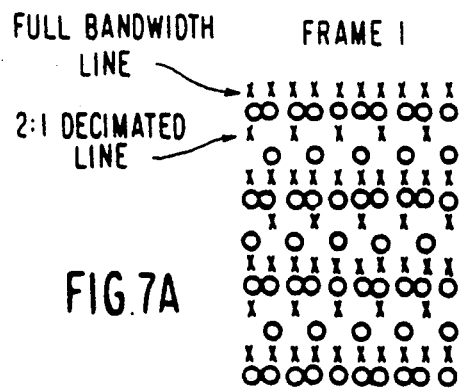
FIGS. 7A through 7D are illustrative diagrams showing artifact distribution in the output luminance signal for a transmit processor of FIG. 4 having two degrees of freedom.
Figure 7B:
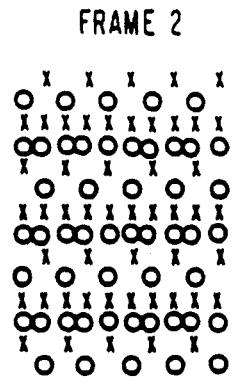
Figure 7C:
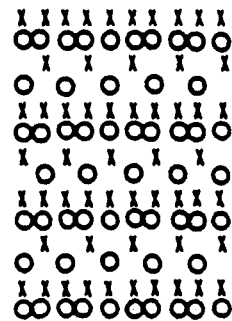
Figure 7D:
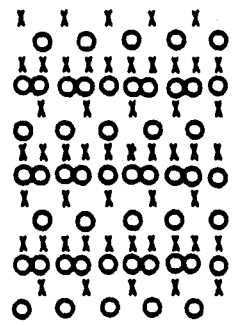

Referring to FIGS. 4 and 5, a compound TMVT system according to the present invention comprises a transmit processor 100 and a receive processor 200. The system uses the more highly correlated lines in an adjacent video field for interpolation of high frequency components of a luminance signal removed during signal compression. The system advantageously uses the conventional transmission format consisting of a line pair comprising one full bandwidth line and one reduced bandwidth line. However, according to the present invention, the high frequency component of the full bandwidth line comes from the adjacent field but no scan conversion takes place. As discussed below, no vertical filtering of the high frequency component is performed. The high frequency component is simply taken from an adjacent line in the adjacent or previous field while the reduced bandwidth line is simply the adjacent line in the current field. Coding proceeds as such, with the high frequency component always being taken from the immediately preceding field.

Referring specifically to FIG. 4, transmit processor 100 comprises a horizontal low pass filter 102 receiving an input luminance signal and producing a half bandwidth signal, and a transmit subtractor 104 receiving both the input luminance signal and the half bandwidth signal and producing a high frequency signal, which is provided to an adder 110 via a frame storage circuit 106. Storage circuit 106 advantageously can be a first-in/first-out buffer memory device, a random access memory (RAM) device, a static RAM (SRAM) device or another storage means having a capacity equivalent to at least one full video field. Preferably, storage circuit 106 stores at least N+1 lines of video information, where N is the number of lines in a field, when the system is employed in a conventional NTSC system.

Transmit processor 100 further comprises a transmit demultiplexer 108 receiving the half bandwidth signal from filter 102 and providing the half bandwidth signal to both adder 110 and a transmit multiplexer 112, which additionally receives the signal produced by adder 110.

During operation, the input luminance signal is low pass filtered by filter 102 to produce the half bandwidth signal, which signal is provided to both subtractor 104 and demultiplexer 108. Subtractor 104 subtracts the half bandwidth signal from the input luminance signal to generate a signal corresponding to the high frequency component of the input luminance signal. The high frequency component is then stored in storage circuit 106.

Demultiplexer 108, adder 110 and multiplexer 112 advantageously cooperate to produce the TMVT mixed field signal. Preferably, demultiplexer 108, in an exemplary case, provides the half bandwidth signal corresponding to odd numbered lines of the current field to adder 110 while providing even numbered lines directly to multiplexer 112. Adder 110 adds the high frequency component from an adjacent line of the previous field to the odd numbered lines of the current video field to produce a full bandwidth signal which is also output to multiplexer 112. The full bandwidth signal input and the half bandwidth signal input to multiplexer 112 advantageously are multiplexed to produce the mixed field signal, which is then transmitted in a conventional manner.

It will be appreciated that the half bandwidth signal corresponding to the even numbered lines in the exemplary case are subjected to additional processing, i.e., these signals are horizontally decimated by a factor of 2:1 and time compressed. Preferably, the additional signal processing such as horizontal decimation is provided by controlling multiplexer 112 in a manner well known to those of ordinary skill in the art. Alternatively, horizontal decimation of the half bandwidth signal advantageously can be performed by dedicated circuitry (not shown) on the input side of multiplexer 112.

Referring to FIG. 5, receive processor 200 comprises a demultiplexer 202 receiving the mixed field signal and producing a full bandwidth receive signal, which is provided to a horizontal low pass filter 204, a subtractor 208 and a multiplexer 212, the demultiplexer 202 also providing a half bandwidth receive signal to a horizontal time expansion circuit 206. Subtractor 208 generates a difference signal corresponding to the high frequency component of the mixed field signal, and the high frequency component is in turn provided to an adder 210, whose output is connected to one input of multiplexer 212.

During operation, the full bandwidth signal contained in the mixed field signal is provided directly from the output side of demultiplexer 202 to the input side of multiplexer 212. The signal corresponding to the horizontally decimated portion of the mixed field signal is interpolated in expansion circuit 206 and provided to the input side of adder 210, which advantageously receives the high frequency component of the full bandwidth signal from subtractor 208. Thus, another full bandwidth signal, which corresponds to the even numbered lines in the exemplary case, is provided by adding the high frequency component produced by subtractor 208 to the output of expansion circuit 206. Multiplexer 212 advantageously provides an output luminance signal having full bandwidth lines for each line in the current field.

Figure 2:
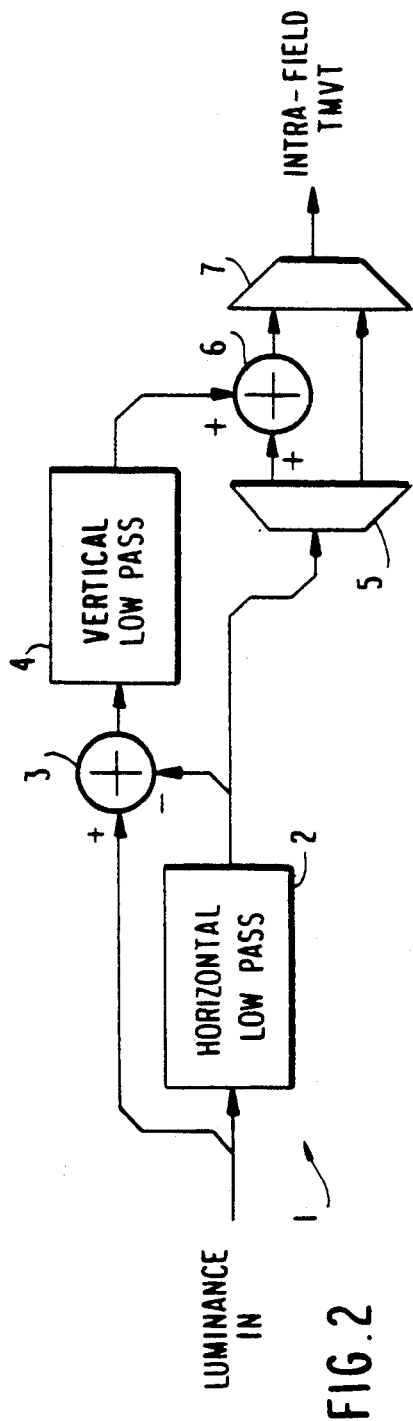
FIG. 2 is a schematic diagram of a conventional transmit processor for generating time-multiplexed video transmission signals.
Figure 3:
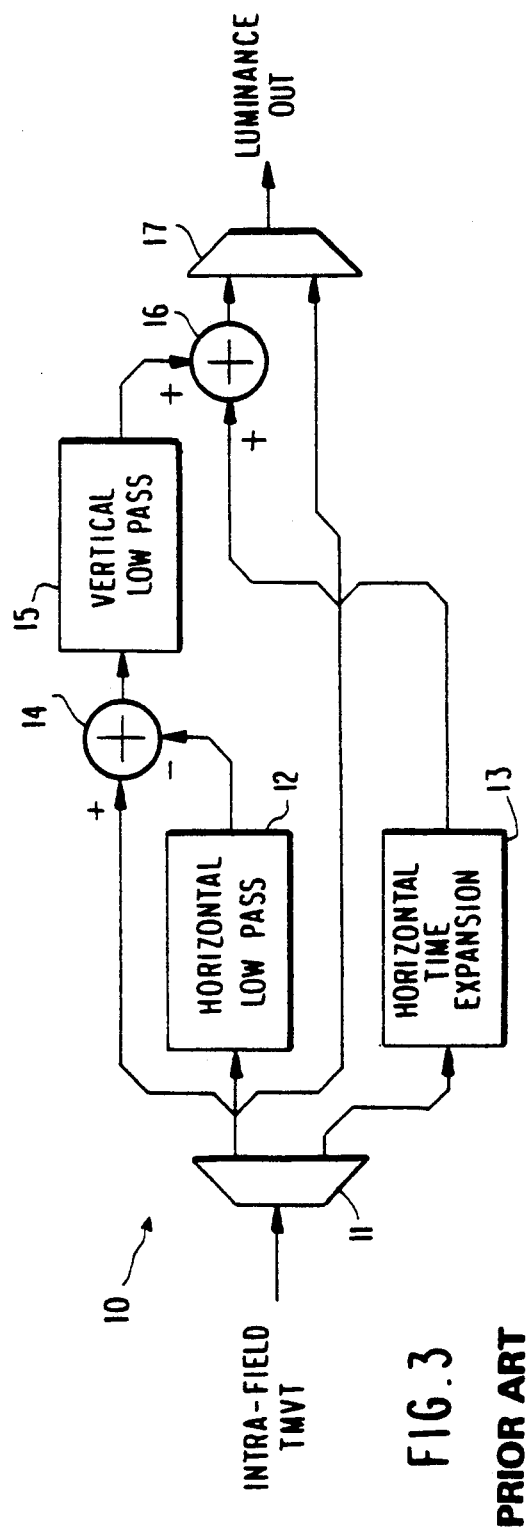
FIG. 3 is a schematic diagram of a conventional receiver processor for generating an output luminance signal based on the time-multiplexed video transmission signal produced by the circuitry of FIG. 2.

It will be apparent that the receive processor 200 of the present invention is similar to the conventional receive processor shown in FIG. 3 but differs primarily in that no vertical interpolation to recover the decimated portion of the high frequency component produced by the transmitter of FIG. 2 is required. The high frequency component is merely repeated on the reduced bandwidth line.

Figure 6:
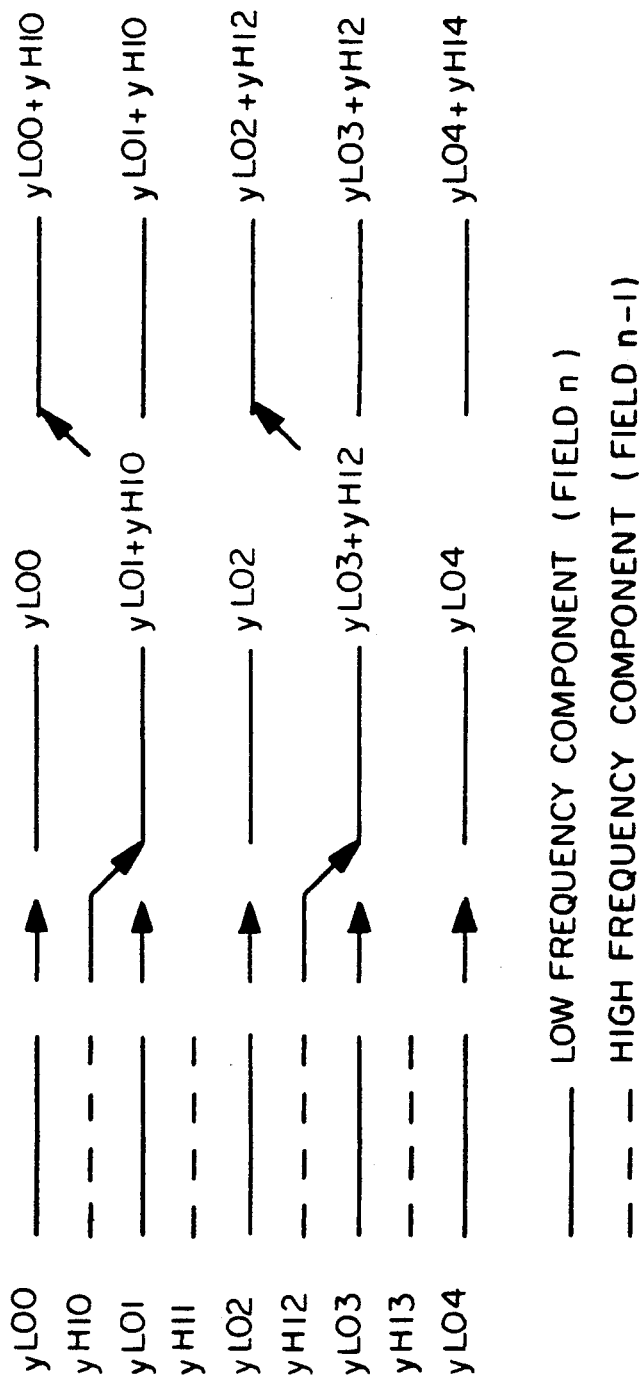
FIG. 6 is an illustrative diagram showing artifact distribution in the output luminance signal for a transmit processor of FIG. 4 having one degree of freedom.

It will also be appreciated that the system according to the present invention provides a TMVT processing system having two degrees of freedom, which advantageously permits artifacts resulting from video processing to be evenly distributed in the resultant video image, thus eliminating field crawl. As shown in FIG. 6, error dispersal is accomplished by providing the same high frequency interpolation error to each line of the output luminance signal. In other words, every line in every field is encoded with the same relative amount of high frequency interpolation error. It will be appreciated that this even dispersal of error eliminates the field crawl artifact present in conventional intra-field processor systems.

Finally, it will be apparent that the TMVT processor system according to the present invention permits implementation of time-variant offset sub-sampling. As shown in FIGS. 7A through 7D, artifacts produced by transmit processor 100 are hidden by varying the processing sequence, particularly the decimation sequence, so that odd and even numbered pixels in odd and even numbered lines in alternating fields are decimated in a predetermined sequence. In other words, the artifacts created by system coding appear in different positions in different lines in different frames during video image reproduction. While this artifact distribution function is similar to the conventional approach used in concealing the chrominance sub-carrier in NTSC and PAL composite video systems, the TMVT processing system according to the present invention advantageously provides luminance artifact distribution having two degrees of freedom.

It will be appreciated that the system described above provides a cost effective TMVT processing system due to lack of vertical filters and the low cost of the frame storage device employed in the transmit processor. The system of the present invention advantageously provides increased spatial resolution due to the high degree of correlation between adjacent lines in an inter-field environment, greater vertical impulse response due to the lack of vertical filtering, and an even error dispersal. It should be noted that the need for vertical filtering can be eliminated in the mixed TMVT processing system, which simplifies the circuitry and can provide a subjectively better picture if vertical aliasing can be ignored or eliminated by the use of an input comb-filter.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A system for transmitting and receiving a signal corresponding to a video signal component for driving a video display, said system comprising:
   transmit means for processing a received video signal component so as to produce a time-multiplexed mixed field signal based on a high frequency signal corresponding to a high frequency portion of said input video signal component received during a previous field and a half bandwidth signal received during a current field; and
   receive means for processing said mixed field signal so as to produce an output video signal component based on said high frequency portion and said half bandwidth signal.

2. The system of claim 1, wherein said previous and said current fields each comprise a plurality of lines and wherein said transmit means further comprises:
   adding means for adding said high frequency portion to said half bandwidth signal corresponding to selected ones of said lines so as to provide a full bandwidth signal; and
   first means for multiplexing said half bandwidth signal corresponding to non-selected ones of said lines with said full bandwidth signal so as to provide said mixed field signal.

3. The system of claim 2, wherein said transmit means further comprises means for storing said high frequency portion of said input video signal component from said previous field.

4. The system of claim 3, wherein said means for storing comprises a first-in/first-out buffer memory circuit.

5. The system of claim 1, wherein said receive means further comprises:
   means for separating said mixed field signal into a received half bandwidth signal and a received high frequency portion; and
   second means for multiplexing said received half bandwidth signal and said received high frequency portion so as to produce said output video signal component, said output video signal component having a full bandwidth in each of said lines of said current field.

6. The system of claim 1, wherein said previous and said current fields each comprise a plurality of lines, wherein said transmit means further comprises means for storing said high frequency portion of said input video signal component of said previous field corresponding to adjacent lines of said current field, wherein said transmit means produces an artifact in said mixed field signal, and wherein said artifact is distributed in said output video signal component in a predetermined sequence.

7. A compound time-multiplexed video transmission processing system transmitting and receiving a signal corresponding to luminance signal for driving a video display, said system comprising:
   a transmit processor receiving an input luminance signal, said transmit processor comprising:
   a low pass transmit filter providing a half bandwidth signal based on said input luminance signal;
   a transmit subtractor operatively coupled to said transmit filter and generating a high frequency signal from the difference between said input luminance signal and said half bandwidth signal;
   storing means operatively coupled to said subtractor for storing said high frequency signal from a current field and at least one previous field;
   a transmit demultiplexer operatively coupled to said transmit filter;
   a transmit adder operatively coupled to said storage means and said demultiplexer for producing a full bandwidth signal based on said half bandwidth signal and said high frequency signal from said previous field;
   a transmit multiplexer operatively coupled to said transmit adder and said demultiplexer for producing a time-multiplexed video transmission mixed field signal based on said full bandwidth signal and said half bandwidth signal;
   a receive processor receiving said mixed field signal and generating an output luminance signal, said receive processor comprising:
   a demultiplexer providing a full bandwidth received signal and a half bandwidth received signal based on said mixed field signal;
   a low pass receiver filter operatively coupled to said demultiplexer for producing a filtered full bandwidth signal based on said full bandwidth received signal;
   a subtractor operatively coupled to said demultiplexer and said receiver filter for generating a high frequency component signal based on said full bandwidth received signal and said filtered full bandwidth signal;
   a time expansion circuit operatively coupled to said multiplexer for producing a half bandwidth time expanded signal based on said half bandwidth received signal;
   an adder operatively coupled to said time expansion circuit for generating a composite full bandwidth signal based on said a high frequency component and said time expanded signal; and a receiver multiplexer operatively coupled to said demultiplexer, said time expansion circuit and said subtractor for generating an output luminance signal based on said full bandwidth received signal and said composite full bandwidth signal.

8. The system of claim 7, wherein said transmit multiplexer further comprises means for horizontally decimating said filtered half bandwidth signal.

9. The system of claim 7, wherein said filtered half bandwidth signal comprises a plurality of pixels and wherein said transmit multiplexer further comprises means for horizontally decimating a selected one of odd and even pixels of said pixels of said filtered half bandwidth signal.

10. The system of claim 7, wherein said storing means has a capacity for storing an amount of said high frequency signal corresponding to at least one of said fields plus one line.

11. A method for processing a luminance signal for a system having a transmit processor means for processing an input luminance signal for a video image and having a storage circuit storing a high frequency signal based on the input luminance signal and a receive processor means for receiving and processing a transmitted signal based on said input luminance signal to produce an output luminance signal, said method comprising the steps of:

generating a half bandwidth signal responsive to the input luminance signal;

storing the high frequency signal corresponding to about one field of a video image defined by a current line of a current field and an adjacent line of a previous field;

producing a time-multiplexed mixed field signal based on said half bandwidth signal and the high frequency signal corresponding to said adjacent line of said previous field;

acquiring said mixed field signal in a receive processor;

separating said mixed field signal into a received half bandwidth signal and a received full bandwidth signal;

subtracting said received half bandwidth signal from said received full bandwidth signal so as to produce a high frequency portion of said mixed field signal; and combining said received full bandwidth signal, said received half bandwidth signal and said high frequency portion to produce the output luminance signal.

12. The method of claim 11, wherein said producing step further comprises the step of horizontally decimating said half bandwidth signal corresponding to lines in said fields of the video image in a predetermined sequence.

* * * * *